Oct. 29, 1963 D. V. SINNINGER 3,109,124

ELECTRICAL SOCKET ADAPTER HAVING TUBE PIN BASE

Filed April 28, 1960

INVENTOR.
Dwight V. Sinninger
BY
Olson, Mecklenburger, von Holst, Pendleton & Neuman. Attys.

United States Patent Office 3,109,124
Patented Oct. 29, 1963

3,109,124

ELECTRICAL SOCKET ADAPTER HAVING TUBE PIN BASE

Dwight V. Sinninger, Oak Park, Ill., assignor to Senn Custom, Inc., Oak Park, Ill., a corporation of Illinois Filed Apr. 28, 1960, Ser. No. 25,405
7 Claims. (Cl. 317—101)

This invention pertains to adapters suitable for use with electrical sockets and more particularly pertains to an adapter device having a tube pin base which may be utilized as a vacuum tube socket adapter.

Socket adapters of the type herein contemplated are designed to be connected into a circuit and to, in turn, receive some further electrical device, with or without inserting further electrical components in the connected circuits. More specifically, adapter devices are provided having multi-pin bases which plug into chassis-mounted female sockets and which receive a tube or other electrical device in a part of the adapter remote from the chassis socket. A space is provided within the adapter to receive conductors for connecting the pins of the base with the contacts of the received device, either pin-for-pin or in any other varied pattern desired. Suitable circuit components can be housed in the body and electrically interposed between the various pins and conductors therein. External connections for injecting or tapping off voltages can be provided from or to any internal part by insulated wires leading out of the device. In addition to their use for changes of circuitry, such adapters permit one type of vacuum tube to be used at a socket intended for another type tube having more or less pins and/or different basic pin patterns.

A necessary restriction placed on an effective vacuum tube adapter is the requirement for compact size. When the original tube is separated from its circuit, and it is associated with connections and new components within the shell of the adapter, a minimum of disruption should be imposed on the original circuit condition. For example, the tube should not be physically removed from its original location by much more than an inch lest stray capacitance and/or lead inductances within the adapter unduly upset original circuit conditions. The need for compact size requires that the adapter body must be short and of small diameter. This results in a crowded assembly—and one which is difficult to fabricate. When circuit components are required in the adapter, the space becomes still more restricted and cramped.

In observing the requirement for a compact configuration, known adapters must be painstakingly assembled with excessively long conductors, and once closed up the adapter generally cannot be reopened without destruction of the housing and complete rewiring.

It thus is desirable to design an adapter which is as small as possible but which is easily assembled with suitable connecting wires and circuit components and with the connecting leads being as short as possible. Further, it is desirable to be able to open the adapter for inspection, test, alteration, repair and/or replacement of components without mutilating or destroying the adapter or the wiring and components therein. Additionally, such an adapter should provide means for shielding and grounding the tube or other component connected thereto, as well as providing shielding and a ground connection for the circuit components within the adapter.

It is an object of this invention to overcome the problems outlined above and to provide an adapter having the noted desirable features.

It is an object of this invention to provide an adapter which may wired after the contacts thereof are in their final fixed relationship.

It is a further object of this invention to provide an adapter which will be of minimum size, with leads as short as possible and which will provide ready access to the connections and/or components within the adapter.

It is still another object of this invention to provide an adapter permitting inspection, testing, alteration, repair and/or replacement of wiring or components therein without mutilating or destroying the device.

It is yet another object of this invention to provide an adapter which facilitates shielding and grounding the connected electrical device as well as the wiring and components housed therein and is adapted to retain a conventional cylindrical shield which retains the electrical device in the adapter.

It is yet a further object of this invention to provide ready access to external leads for supplying or picking off voltages internally in said adapter.

Another object of this invention is to provide an adapter which meets the foregoing objects and which is yet of simple rugged construction, easy to use and assemble, and economical to manufacture.

These and other objects will become apparent to the person skilled in this art from a study of the following description and claims and the accompanying drawing.

In carrying out this invention in one form an electrical socket adapter is provided including a socket having a plurality of pin contacts extending therethrough, a longitudinally split hollow body comprising two halves, and a base pin member. One half of the body is secured at one end to the socket and carries the pin base at its opposite end. The second half of the body is detachably secured at one end to the socket and has its opposite end conformed to the pin base. The two halves of the body, the socket and the pin base define a closed compartment which houses the wiring and components connected between and among the pins in the base and the contacts of the socket. The detachable body half provides access to the interior of the housing. The adapter is preferably of metal to provide shielding and a grounding connection and may include a ground connection pin threaded, staked, or otherwise secured centrally in the pin base. The preferred means for joining the socket and the body is a metal collar surrounding the socket and a metal vacuum tube shield base.

For a more complete understanding of this invention, reference should be had to the drawing, wherein.

Figures 1, 4, 5:
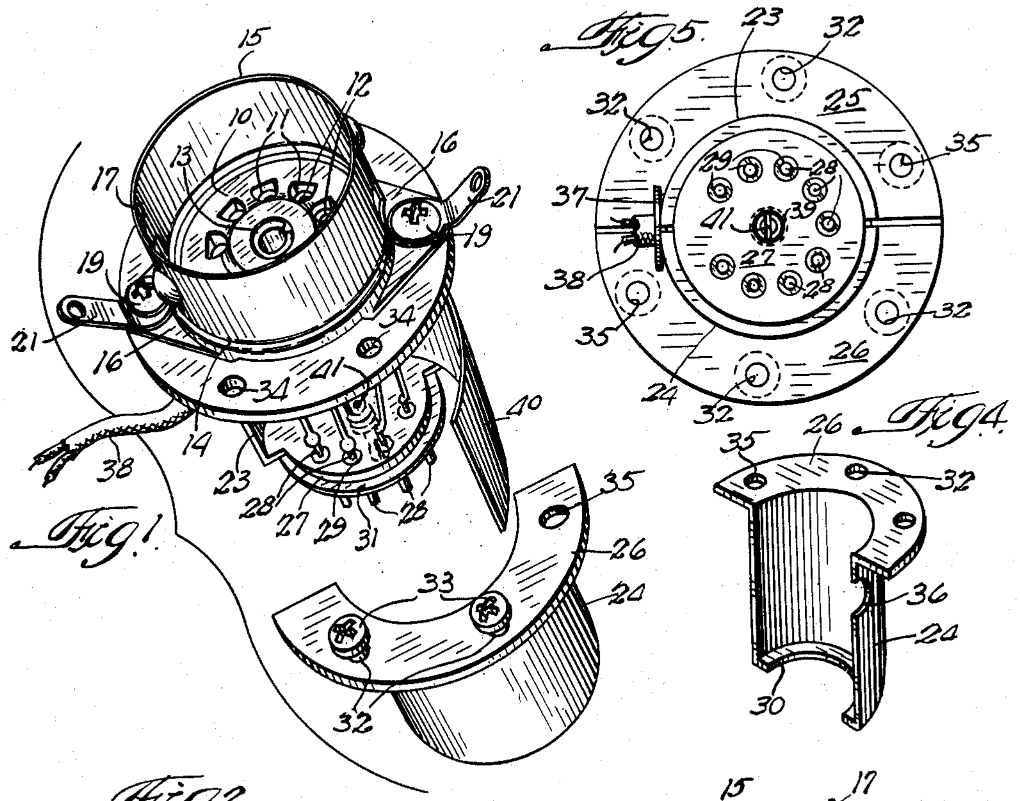
FIG. 1 is a perspective view of a vacuum tube adapter according to this invention, with the detachable portion of the body detached.
FIG. 4 is a perspective view, in reduced scale, of the removable portion of the body.
FIG. 5 is a bottom plan view of the device of FIG. 2.
Figure 2:
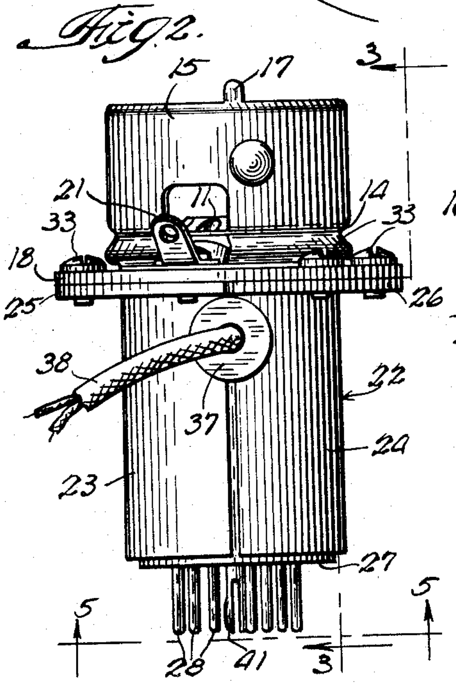
FIG. 2 is a side elevation view of the device of FIG. 1 in assembled condition.

Referring now to the drawings, there is illustrated a 9-pin adapter including a female socket comprising a base 10 provided with passages 11 therethrough, and in which are mounted pin contacts 12. The contacts 12 are insulated one from the other and from the surrounding structure, preferably by forming base 10 of a common moldable insulating material. The base is also formed with a central opening 13 provided with a metallic eyelet to receive the central pin on some equipment and to electrostatically shield the peripheral pins. Suitably secured to base 10, as by crimp 14, is a metallic tube shield base 15 formed with integral mounting ears 16 and a pressure finger 17. Secured to the shield and thus to the socket, is a rigid annular mounting flange 18 which surrounds base 10. This flange is mounted by screws 19 which pass through lugs 21 and ears 16, and have threaded engagement with suitable openings in the flange.

Depending from flange 18 is the adapter body 22 comprising the two halves 23 and 24 of a longitudinally divided cylinder. These halves 23 and 24 are provided with circumferentially coextensive flanges 25 and 26, respectively, which flanges collectively are coterminous with flange 18. Body portion 23 carries a circular pin base at the end opposite flange 25. This pin base comprises a base plate 27 and a plurality of suitably disposed pins 28 which extend through the base plate, the pins being mounted in the plate by suitable insulating material such as molded glass 29. Base plate 27 is provided with a shoulder 31 for receiving the conforming end 30 of body portion 24. The flanges 25 and 26 are provided with threaded openings 32 for receiving mounting screws 33. The screws 33 pass through suitable openings 34 in flange 18 and threadedly engage openings 32 for mounting the body. Openings 35 in flanges 25 and 26 permit free passage of the lower ends of screws 19.

Adjoining edges of portions 23 and 24 are formed with semi-circular openings 36 which co-operate to define a passage in which is mounted a cable grommet 37. An external lead 38 passes through the grommet 37.

The pin base is formed with a threaded opening 39 into which is threaded a split prong ground pin 41.

An insulation sheet 40 extends around the inside surface of the body 22.

Figure 3:
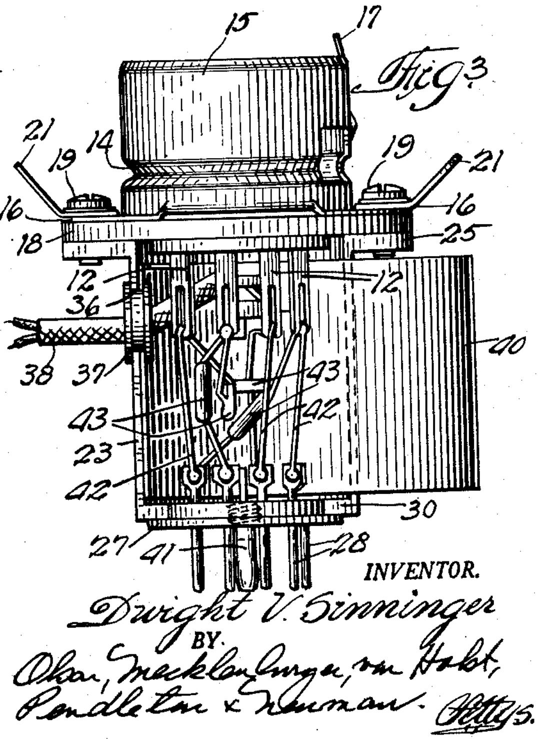
FIG. 3 is a side elevation view of the device of FIG. 1, viewed from the open side.

With portion 23 mounted and portion 24 removed, as shown in FIGS. 1 and 3, the pin base is in its final fixed position relative to pin contacts 12, but one side of the body is completely open to permit access to the body interior. In this stage of assembly (or disassembly) conductors 42 and components 43, such as resistors and capacitors, may be inspected, mounted, or replaced, or other necessary internal construction, test or maintenance operations carried out. The conductors of external lead 38 may be connected to the contact in opening 13 or may supply or pick off voltages to or from any of the other contacts or leads within the housing. Conductors 42 and suitable components 43, of course, connect and cross-connect pins 28, pin contacts 12, and connections such as lead 38 and ground pin 41, to obtain the adaptation or change of circuitry desired in a given installation in accordance with known principles.

Portion 24, when in mounted position, complements portion 23 and conforms to base plate 27, thus closing the hollow interior of the body. This portion is mountable and dismountable, without moving or disturbing the internal parts, simply by manipulation of the related screws 33. Simultaneously, ready access is had to lead 38 upon removal of portion 24, as the lead is disposed in the passage formed at the abutting edges of the body portions.

Flange 18 and body 22 are preferably formed of metal. Thus, shield base 15 is grounded to the adapter body which, in turn, is grounded to the ground pin 41 for carrying the ground connection through to the chassis. A metallic tube shield (not shown) can be fitted over a tube (not shown) mounted in the adapter the same as would be done with the tube resting in the original socket (not shown), and will be grounded through the path outlined above. Where a chassis mounted tube socket has no ground connection for a pin 41, a separate ground wire (not shown) may be connected to the adapter body, as at lug 21, or a conventional spring wiper (not shown) may be provided on a grounded chassis.

The tube shield base also serves as a hold-in device. The grounded metallic body 22 also serves as a radio-frequency shield for the pin-to-pin leads and associated circuit components housed within the adapter.

It will thus be seen that an adapter has been provided which permits use of very short connecting wires and which permits free and repeated access to the internal connections and components of a normally enclosed, shielded, and grounded adapter unit. This access is easily gained and is had without mutilating or destroying the adapter unit. A wide variety of circuitry changes is made possible with one adapter unit, and these changes may be made in the field subsequent to initial assembly. Further, the device is simple, rugged, and economical to manufacture.

While a particular embodiment of this invention is shown, it will be understood, of course, that the invention is not to be limited thereto, since many modifications may be made in light of this disclosure. It is contemplated, therefore, by the appended claims, to cover any such modifications as fall within the true spirit and scope of this invention.

I claim:

1. An electrical socket adapter comprising a socket including a base and a plurality of insulated pin contacts extending through said base, a longitudinally divided hollow body including at least a first portion and a second portion, said first portion secured at one end to said base, a base plate secured to the distal end of said first portion, said second portion of said split body complementing the remainder of said body, securing means external of said hollow body and adjacent said base for detachably mounting said second portion on said adapter whereby said second portion is removable to provide access to the interior of said body, said socket, said body and said base plate defining an enclosed connector space, a plurality of insulated pins mounted in said base plate, and electrically conductive means disposed within said space and interconnecting said pin contacts and said pins.

2. An electrical socket adapter as in claim 1 and wherein said body portions are formed with cooperative openings defining a passage for a conductor through one side of said body.

3. An electrical socket adapter comprising a socket including a base and a plurality of insulated pin contacts extending through said base, flange means attached to said base, a longitudinally divided hollow cylindrical body including at least a first portion and a second portion, said first portion including a flange at one end secured to said flange means, a base plate mounted on and protruding laterally from the distal end of said one portion, said second portion of said split body complementing the remainder of said body and including a flange at one end detachably securable to said flange means whereby said second portion is removable to provide access to the interior of said body, the distal end of said second portion conforming to the protruding portion of said base plate, said socket, said body and said base plate defining an enclosed connector space, a plurality of insulated pins mounted in and extending through said base plate, and electrically conductive means disposed within said body and interconnecting said pin contacts and said pins.

4. An electrical socket adapter as in claim 3 and wherein said socket includes a tube shield base mounted thereon, said flange means being in electrically conductive contact with said tube shield base, and said flange means and said body being formed of metal.

5. In an electrical socket adapter including a female socket having pin contactors, a hollow body extending from said socket, a pin base on the distal end of said body, said pin base having pins extending therefrom, and electrical conductors within said body interconnecting said contactors and said pins, the improvement comprising a longitudinally divided hollow body including at least a first portion and a second portion, said first portion being secured to said socket, said pin base being secured solely to said first portion of said body, and securing means external of said body for detachably mounting said second portion on said adapter whereby said second portion is removable to provide access to the interior of said body.

6. In an electrical socket adapter including a female socket having pin contactors, a hollow body extending from said socket, a pin base on the distal end of said body, said pin base having pins extending therefrom, and electrical conductors within said body interconnecting said contactors and said pins, the improvement comprising a longitudinally divided hollow body including at least a first portion and a second portion, said first portion being secured to said socket, said pin base being secured solely to said first portion of said body, securing means external of said body for detachably mounting said second portion on said adapter whereby said second portion is removable to provide access to the interior of said body and said hollow body being formed with a passage for a conductor through one side of said body.

7. In an electrical socket adapter including a female socket having pin contactors, a hollow body extending from said socket, a pin base on the distal end of said body, said pin base having pins extending therefrom, and electrical conductors within said body interconnecting said contactors and said pins, the improvement comprising a longitudinally divided hollow body including at least a first portion and a second portion, said first portion being secured to said socket, said pin base being secured solely to said first portion of said body, said second portion of said body including a mounting flange on the end thereof adjacent said socket, and means for detachably securing said flange to said socket whereby said second portion is removable to provide access to the interior of said body.

References Cited in the file of this patent

UNITED STATES PATENTS

| | | |
|---|---|---|
| 1,034,910 | Greenway | Aug. 6, 1912 |
| 1,395,108 | Haywood | Oct. 25, 1921 |
| 1,663,544 | Burgesser | Mar. 27, 1928 |
| 1,790,636 | Hollister | Jan. 27, 1931 |
| 1,806,548 | Rabezzana | May 19, 1931 |
| 1,825,534 | Mavrogenis | Sept. 29, 1931 |
| 2,067,796 | Smith | Jan. 12, 1937 |
| 2,653,219 | Popp | Sept. 22, 1953 |
| 2,913,633 | Iannelli | Nov. 17, 1959 |
| 2,941,179 | Peters | June 14, 1960 |